(12) United States Patent
Peters et al.

(10) Patent No.: US 6,718,446 B1
(45) Date of Patent: Apr. 6, 2004

(54) STORAGE MEDIA WITH BENCHMARK REPRESENTATIVE OF DATA ORIGINALLY STORED THEREON

(75) Inventors: Eric Ryon Peters, Roy, UT (US); Robert L. Short, Niwot, CO (US); Chad Adams, Roy, UT (US); Ronald F. Hales, Riverdale, UT (US)

(73) Assignee: Iomega Corporation, San Diego, CA (US)

( * ) Notice: Subject to any disclaimer, the term of this patent is extended or adjusted under 35 U.S.C. 154(b) by 763 days.

(21) Appl. No.: 09/588,149

(22) Filed: Jun. 5, 2000

Related U.S. Application Data

(60) Provisional application No. 60/181,727, filed on Feb. 11, 2000.

(51) Int. Cl.[7] .............................................. G06F 12/16
(52) U.S. Cl. ...................... 711/162; 711/141; 707/202; 707/204; 714/54
(58) Field of Search ................................. 711/162, 161, 711/141; 707/204, 202, 200, 201, 203; 714/52, 54, 48

(56) References Cited

U.S. PATENT DOCUMENTS

| | | | | |
|---|---|---|---|---|
| 5,446,874 A | * | 8/1995 | Waclawsky et al. | 714/1 |
| 5,870,759 A | * | 2/1999 | Bauer et al. | 707/201 |
| 6,260,113 B1 | * | 7/2001 | Cherian et al. | 711/118 |

* cited by examiner

Primary Examiner—Matthew Kim
Assistant Examiner—Matthew D. Anderson
(74) Attorney, Agent, or Firm—James T. Hagler

(57) ABSTRACT

Data on a master is read into a master image file, and the master image file is manipulated to include a benchmark comprising tracking and verification information tied to at least a portion of the master image file. Thus, a copied-to storage media as copied from the master image file also includes such benchmark, a data alteration of the master image file causes a mis-match with regard to the benchmark in such master image file, and a data alteration of the copied-to storage media also causes a mis-match with regard to the benchmark in such storage media as copied from such master image file. The benchmark may include a part identifier and a security identifier.

36 Claims, 5 Drawing Sheets

---

```
┌─────────────────────────────────────────────┐
│           MASTER IMAGE 24                   │
├─────────────────────────────────────────────┤
│       BOOT INFO. [LOGICAL BLOCK 0]          │
├─────────────────────────────────────────────┤
│    DEAD SPACE [LOGICAL BLOCKS 1-31]         │
│         - PART ID. BYTE COUNT               │
│              -PART ID.                      │
│     -ENCRYPTED SECURITY ID. BYTE COUNT      │
│         -ENCRYPTED SECURITY ID.             │
├─────────────────────────────────────────────┤
│        FAT(s) [LOGICAL BLOCK 32]            │
├─────────────────────────────────────────────┤
│             PARTITION INFO.                 │
├─────────────────────────────────────────────┤
│            DIRECTORY ENTRIES                │
├─────────────────────────────────────────────┤
│               DATA FILES                    │
└─────────────────────────────────────────────┘
```

| IMAGE DATA FILE 26 | | |
|---|---|---|
| IMAGE FILE NAME | PART ID. | CHECKSUM |
| IMAGE027.MST | 0E123 | 2134321219 |
| IMAGE028.MST | 2133D | 6753976543 |
| IMAGE029.MST | 2A232 | 7225433654 |

STORAGE MEDIA WITH BENCHMARK REPRESENTATIVE OF DATA ORIGINALLY STORED THEREON

CROSS-REFERENCE TO RELATED APPLICATION

This application claims the benefit of U.S. Provisional Application No. 60/181,727, filed Feb. 11, 2000 and entitled "Storage Media with Benchmark Representative of Data Originally Stored Thereon", hereby incorporated by reference. This application is related to U.S. application Ser. No. 09/587,509, filed concurrently and entitled "Storage Media with Benchmark Representative of Data Originally Stored Thereon", hereby incorporated by reference.

FIELD OF THE INVENTION

The present invention relates to a benchmark placed on a storage media. More particularly, the present invention relates to such a benchmark that is indicative of the data originally stored on the storage media, whereby changes therefrom may be detected.

BACKGROUND OF THE INVENTION

Storage media, and in particular re-writeable storage media, is at times shipped from a storage media manufacturer/distributor with pre-determined data already stored thereon. For example, the data may be one or more software programs, one or more data structures, one or more data files, and/or the like. Likewise, the re-writeable storage media may be a magnetic or optical in nature, and may be a tape, a disk, or the like. Moreover, the storage media may be read-only, write-only, read-write, or the like, as appropriate.

Once the storage media is shipped with the already-stored data, though, such storage media is quite obviously out of the hands of the manufacturer/distributor, who is then powerless to prevent anyone from making changes to the stored data on the storage media. Accordingly, it is oftentimes useful after shipment of the storage media to determine whether the data on the storage media has changed as compared with the originally shipped data. In addition, during production of the storage media with the data thereon based on a master version, it is useful at various points during the production process to confirm that the data on the storage media has not changed as compared with the data copied from the master.

Accordingly, a need exists for a benchmark that is placed on the storage media and that is closely tied to the master. Thus, reference may be made to the benchmark at various times to determine whether the data on the storage media has changed as compared with the data copied from the master.

SUMMARY OF THE INVENTION

The present invention satisfies the aforementioned need by providing, among other things, a method of controlling use of copying software on a computer, wherein the computer includes a hardware ID ("HWID"). In the method, a hard-coded identifier is accessed from within the copying software when the copying software is launched, and the HWID of the computer is also accessed. The HWID is compared with the hard-coded identifier, and a copying function proceeds only if the HWID and the hard-coded identifier match.

The present invention also provides a method of copying data from a master storage media ("master") for copying such data to a copied-to storage media. In the method, the data on the master is read into a master image file, and the master image file is manipulated to include a benchmark comprising tracking and verification information tied to at least a portion of the master image file. Thus, a copied-to storage media as copied from the master image file also includes such benchmark, a data alteration of the master image file causes a mis-match with regard to the benchmark in such master image file, and a data alteration of the copied-to storage media also causes a mis-match with regard to the benchmark in such storage media as copied from such master image file.

To verify the master image file, an image data file with a data structure corresponding to the master image file is accessed, where the corresponding data structure includes a checksum corresponding to the master image file. The checksum from the corresponding data structure in the image data file is accessed and employed to verify that the accessed master image file is not corrupted.

To copy the master image file to a copied-to storage media, a part identifier is accessed from the master image file, and an image data file with a data structure corresponding to the master image file is accessed, where the corresponding data structure includes a part identifier corresponding to the master image file. The part identifier from the corresponding data structure in the image data file is accessed and compared with the master image file part identifier; and copying proceeds only if the master image file part identifier matches the image data file part identifier.

In addition, a checksum of at least a portion of the master image file is performed to produce a produced checksum. A checksum from the master image file is accessed and compared with the produced checksum, and the copy proceeds only if the master image file checksum matches the produced checksum.

To compare the master image file to a copied-to storage media copied from the master image file, a part identifier is accessed from the storage media, and an image data file with a data structure corresponding to the master image file is accessed, where the corresponding data structure includes a part identifier corresponding to the master image file. The part identifier from the corresponding data structure in the image data file is accessed and compared with the storage media part identifier, and the compare proceeds only if the storage media part identifier matches the image data file part identifier.

In addition, a checksum of at least a portion of the storage media is performed to produce a produced checksum. A checksum from the storage media is accessed and compared with the produced checksum, and the compare proceeds only if the storage media checksum matches the produced checksum.

The invention prevents any unauthorized file image content from being copied to a production disk during the production thereof. In addition, the invention prevents the copying of an image to a production disk if such image was modified after the creation thereof. Further, the invention provides a method and mechanism to determine whether the data on a production disk has been accessed by a computer operating system or otherwise modified; thus for example allowing returned disks to be re-sold as new.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
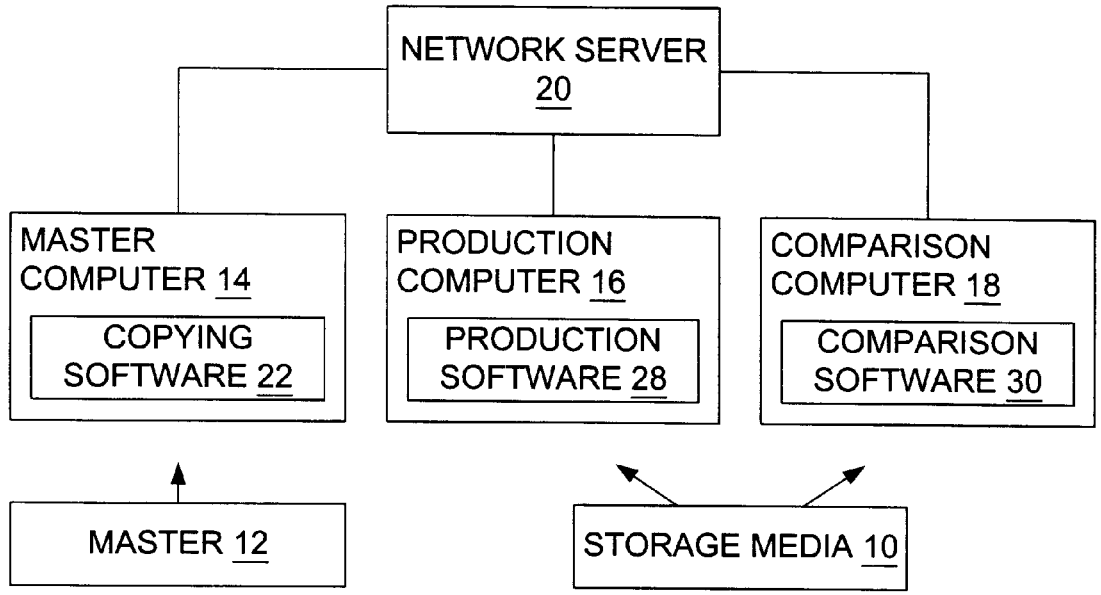
FIG. 1 is a block diagram showing a particular system for producing a benchmark on storage media in accordance with one embodiment of the present invention.

Referring now to FIG. 1, in producing a storage media 10 having data thereon based on a master 12, it is to be understood that four basic operations take place: (1) a master 12 of the data to be stored on the storage media is obtained from an appropriate source and is accessed through a master computer 14 having relatively secure master copying software thereon; (2) an image file is made from the contents of the master 12 by way of the master computer 14; (3) the image file is copied to the copied-to storage media 10 by way of a production computer 16; and (4) the image file is compared to the copied-to storage media 10 by way of a comparison computer 18. Each operation will be addressed herein, in turn.

Each computer 14, 16, 18 may be any appropriate type of computer without departing from the spirit and scope of the present invention. Typically, each such computer 14, 16, 18 would have a display, one or more data input devices (keyboard, mouse, etc.), a processor, memory, and the like. Of course, one or more such elements may not be necessary, depending on circumstances, and therefore may be removed. Each computer 14, 16, 18 should of course have an appropriate storage media drive for reading from and/or writing to a storage media 10 and/or a master 12, as may be appropriate.

In the case of the production computer 16 and the comparison computer 18, the process of inserting the storage media 10 into and removing the storage media 10 from the respective drives (arrows 1 and 2 in FIG. 1) may be automated by use of appropriate apparatus such as for example a robotic device (not shown), especially in the case of a more than minimal volume operation. Moreover, such apparatus may also move the storage media 10 between the computers 16, 18 and the drives thereof, as appropriate. Any appropriate automation apparatus may be employed without departing from the spirit and scope of the present invention. Since the details of such automation apparatus are known to the relevant public, further details are not provided herein except as stated below.

As seen, each computer 14, 16, 18 may be networked together as is necessary to share information, as will be discussed in more detail below. Thus, each computer 14, 16, 18 can access the information on the other computers 14, 16, 18, assuming of course that appropriate security access is granted. In addition or in the alternative, information may be accessed by each computer 14, 16, 18 from a network computer or server 20. Of course, any appropriate networking and sharing arrangements may be employed without departing from the spirit and scope of the present invention. In fact, information may even be exchanged between computers by hand (i.e., by portable storage media) if appropriate and/or necessary. Moreover, two or more of the three computers 14, 16, 18 may even be embodied in the form of a single computer.

Controlling use of Master Copying Software

Preliminarily, it should be ensured that the master 12 originates from a trustworthy source, and is not created by a non-approved entity. Accordingly, the master 12 should be obtained from such trustworthy source in some manner to ensure that the data on such master 12 is in fact from the trustworthy source and in a form that the trustworthy source intended, and also to ensure that the data on such master 12 is itself trustworthy and has not been tampered with. The master 12 may originate from any appropriate source and have any appropriate data thereon without departing from the spirit and scope of the present invention. As but one example, the master 12 may originate from the marketing department of a manufacturer of the storage media 10, whereby the data stored on the master 12 results from cross-promotional arrangements with other manufacturers and/or distributors. As will be explained below, in one embodiment of the present invention, the master 12 is a storage media similar to if not identical with the copied-to storage media 10, although the master may alternatively be a different type without departing from the spirit and scope of the present invention.

Importantly, the entity copying the data from the master 12 by way of the master computer 14 must be trustworthy also. In one embodiment of the present invention, then, the master computer 14 receiving the master 12 for copying purposes is tightly controlled, such master computer 14 includes copying software 22 that copies the data from the master 12, as will be explained in more detail below, and the copying software 22 is tightly tied to such master computer 14. In such embodiment, and referring now to FIG. 2, the master computer 14 includes a hardware ID ("HWID") or the like that is unique to the master computer 14, such HWID is obtained from the master computer 14 (step 201), the copying software 22 is hard-coded with such HWID (step 203), and such copying software 22 operates only on the master computer 14 having such HWID. For example, if the master computer includes a PENTIUM III processor as produced and/or marketed by INTEL Corporation of Santa Clara, Calif., then the HWID may be the unique ID associated with the PENTIUM III processor ("the PENTIUM III ID"). Of course, any other appropriate identifying indicia from any particular master computer 14 may be employed without departing from the spirit and scope of the present invention. Any appropriate methodologies may be employed to obtain the HWID from the master computer 14 and to hard-code such HWID into the copying software 22 without departing from the spirit and scope of the present invention. Since such methodologies should be known or apparent to the relevant public, further details thereof are not disclosed herein.

In one embodiment of the present invention, when the master computer 14 is directed to launch the copying software 22 by a user or the like, such copying software 22 accesses the HWID hard-coded therein (step 205), accesses the HWID of the master computer (step 207), and compares such accessed HWID with such hard-coded HWID (step 209). The copying software 22 then proceeds only if the accessed and hard-coded HWIDs match (step 211).

Figures 2, 5:
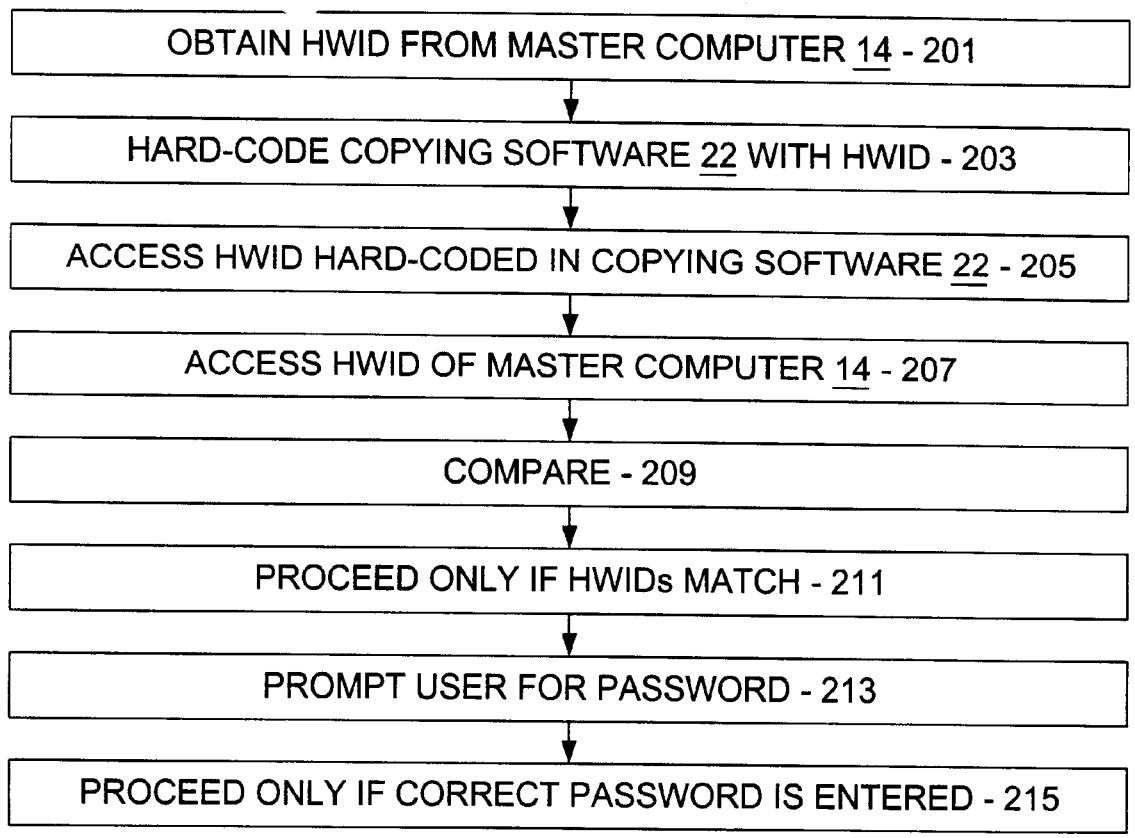
FIG. 2 is a flow chart showing steps performed during controlling of access to a master computer in accordance with one embodiment of the present invention.
FIG. 5 is a block diagram showing a data structure corresponding to the master image/image file of FIG. 3 in an image data file as created in accordance with one embodiment of the present invention.

In one embodiment of the present invention, and still referring to FIG. 2, to further enhance security, the copying software 22 requires a correct password from the user thereof. Thus, the copying software is pre-programmed with such password, prompts the user to enter such password (step 213), and proceeds only if the correct password is entered (step 215). Thus, such copying software 22 operates only if such software 22 resides on the correct master computer 14 and only if initiated by a user with the correct password. As a result, a non-authorized entity is severely limited in its ability to copy data onto a storage media 10 from a master 12 in the manner to be detailed below.

Operation of Master Copying Software 22

Once the copying software 22 has verified that it is on the correct master computer 14 and is being operated by a user with the correct password (as detailed in connection with FIG. 2), such software 22 may then be employed to copy the data from the master 12 for purposes of copying such data to a copied-to storage media 10. In one embodiment of the present invention, such copying software 22 copies the master 12 by creating a master image 24 (FIG. 3) from the master 12, as will be explained in more detail below.

Presumably, the master 12 and the data thereon is in its final form and has been created by a trustworthy entity according to a particular operating system. As such, the data is organized on the master 12 according to the particular operating system, and the master 12 includes referencing features specified by the particular operating system for referencing the data. Here, it is to be assumed that the operating system is a disk operating system such as the MICROSOFT DISK OPERATING SYSTEM (DOS) produced and/or marketed by MICROSOFT Corporation of Redmond, Wash., or the like. Of course, other operating systems can be employed without departing from the spirit and scope of the present invention.

The master 12 is of course properly inserted into an appropriate drive in the master computer 14 such that the master computer 14 can access the data on such master 12. In one embodiment of the present invention, and referring now to FIG. 4, the copying software 22 creates such master image 24 (FIG. 3) in the following manner. Preliminarily, such copying software 22 as operating on the master computer 14 accesses the master 12 in the drive thereof, and in particular accesses a file directory on the master 12 (step 401), such as a DOS file allocation table (FAT). Based on such FAT, and as should be appreciate, the copying software 22 can ascertain file information such as what data/files are located on the master 12, where such data/files are located on the master 12, the size of each file, age information about each file, and other file information (step 403).

Based on such file information from the FAT, the copying software 22 then reads all the data on the master 12 into a single image file which constitutes the master image 24 (step 405). Such image file/master image 24 may be stored at least preliminarily in an appropriate memory on the master computer 14, or may be preliminarily stored elsewhere. Preferably, such image file/master image 24 contains not only all the files on the master 12, but each FAT from the master 12 (if there is more than one such FAT), all partition information from the master 12, all boot information from the master 12, all directory entries from the master 12, etc. That is, the image file/master image 24 as created from the master 12 contains the entirety of the information stored on the master 12, whether such information derives from a file, a file management structure, a storage media management structure, or the like. Creating such an image 24 from such master 12 is known or should be apparent to the relevant public, and therefore need not be described herein in any detail.

As may be appreciated, then, by copying the entirety of the master 12 into the single image file/master image 24, such master image 24 may then be employed at a later time to create a copied image of the master 12 on a copied-to storage media 10. Moreover, the copied image on the copied-to storage media 10 causes the copied-to storage media 10 to behave as if it were the master 12. Thus, if the master 12 includes disk information that such master is a 100 megabyte magnetic disk, the copied-to storage media 10 will behave as if it were a 100 megabyte storage disk, even if such copied-to storage media 10 is in fact a 250 megabyte storage disc, for example.

Once the master image 12 is created from the master, such master image 12 is preferably manipulated to include the aforementioned benchmark. In one embodiment of the present invention, such benchmark comprises certain tracking and verification information. Thus, each copied-to storage media 10 as copied from the master image 24 also includes such tracking and verification information/benchmark. Preferably, the tracking and verification information/benchmark is tied to the master image 24/image file or a portion thereof. Accordingly, and importantly, alteration of the image file will cause a mis-match with regard to the tracking and verification information/benchmark in such image file, as will be explained below. Likewise, and also importantly, alteration of the copied-to storage media 10 will also cause a mis-match with regard to the tracking and verification information/benchmark in such storage media 10 as copied from such image file/master image 24.

Figure 3:
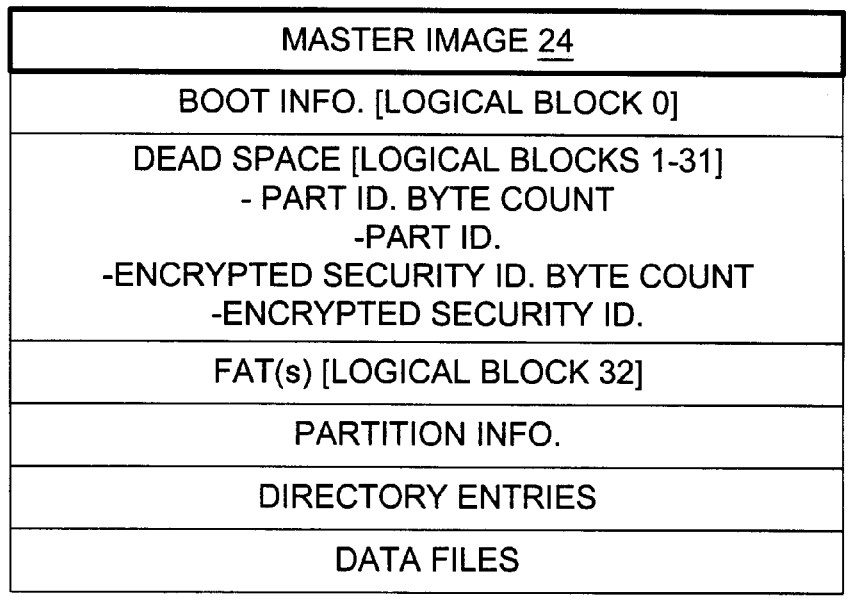
FIG. 3 is a block diagram showing the structure of a master image/image file created in accordance with one embodiment of the present invention.
Figure 4:
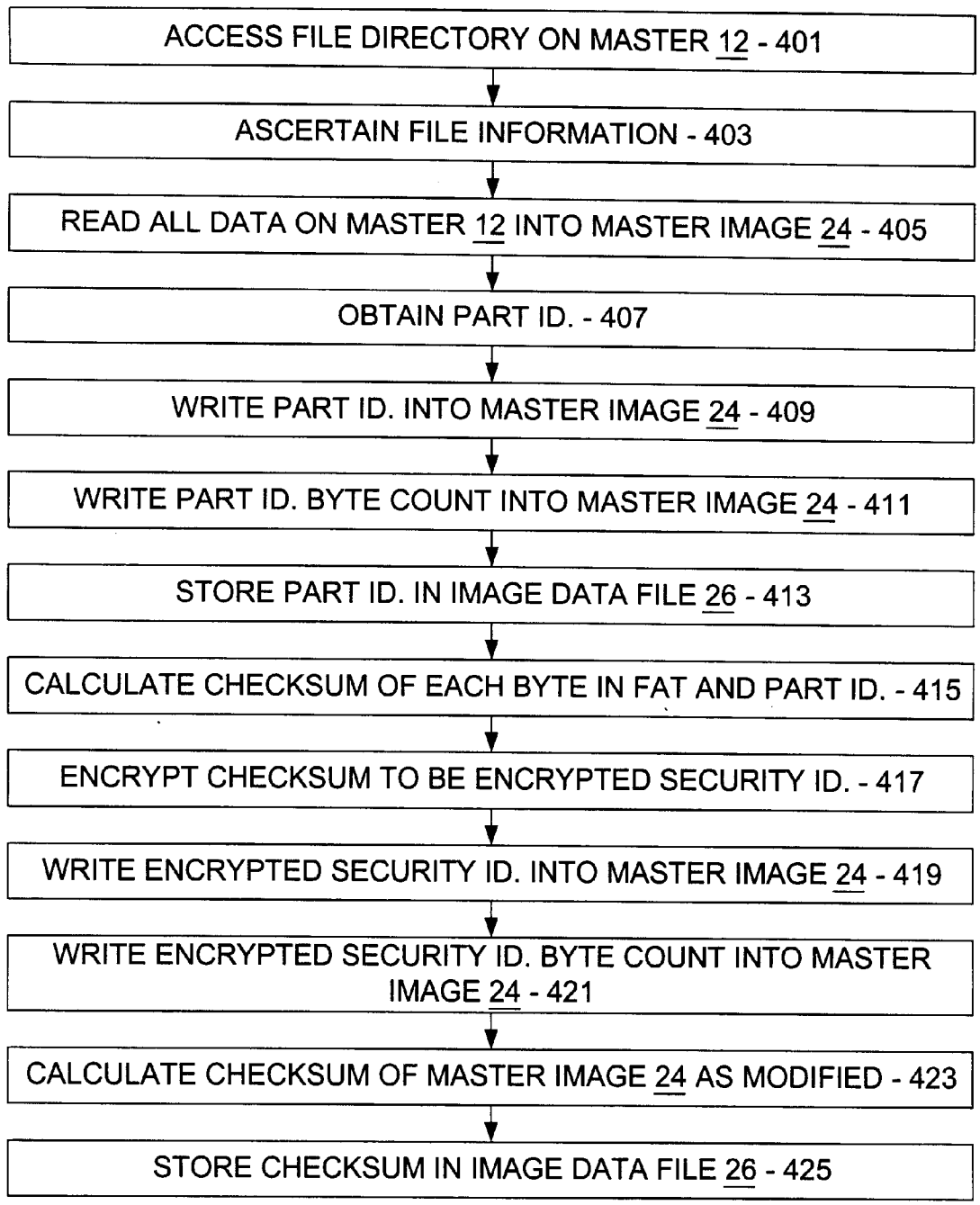
FIG. 4 is a flow chart showing steps performed during copying of a master to the master image/image file of FIG. 3 in accordance with one embodiment of the present invention.

In one embodiment of the present invention, and as seen in FIG. 3, the tracking and verification information/benchmark includes a part identifier such as a part number or model number. As may be appreciated, such part identifier may be assigned on a random or pre-determined basis, and can be employed to label the image file/master image 24 with an identifier. Such part identifier may take any particular form without departing from the spirit and scope of the present invention. For example, such part identifier may be a 10-digit number, a 20-character alphanumeric, etc. As will be appreciated, the part identifier identifies the master image 24, but may also be employed to verify data on a copied-to storage media 10 when copied from such master image 24.

Preferably, the copying software 22 obtains the part identifier from an appropriate source (step 407) and writes the obtained part identifier into an area of the master image 24/image file (step 409) such that the part identifier appears in an inaccessible area when the image file is copied to the storage media 10. That is, according to the architecture of any particular disk operating system, certain physical space on a corresponding storage media is inaccessible by way of such disk operating system, or more simply is "dead". For example, in the aforementioned MICROSOFT DOS disk operating system, at least with regard to the IOMEGA ZIP disk and drive as produced and/or marketed by IOMEGA Corporation of Roy, Utah, logical block 0 of the storage media contains boot information, logical block 32 contains the FAT, and logical blocks 1–31 are expected to be blank.

Since such logical blocks 1–31 are expected to be blank, such disk operating system provides no capability to access such logical blocks 1–31, or put another way such logical blocks 1–31 on such storage media are inaccessible by way of such disk operating system. Although inaccessible by the disk operating system, an appropriate utility application may of course be employed to direct the drive receiving the storage media 10 to write information to/read information from such otherwise inaccessible logical blocks 1–31 and perhaps other dead space. Such utility application is known or should be apparent to the relevant public, and therefore need not be described herein in any detail. Preferably, such utility is not normally available to the general public such that the general public cannot normally access such dead space. Thus, the general public cannot normally alter or otherwise compromise data stored in the dead space on the storage media 10.

In one embodiment of the present invention, the part identifier is a 10-byte identifier and is written into the master image 24 to appear in the copied-to storage media in dead space as such. For example, in connection with the aforementioned IOMEGA ZIP disk, such 10-byte identifier may be written to appear in logical block 1. For verification, a 1-byte byte count or the like of the 10-byte identifier may also be written into the master image 24 to appear in such logical block 1 (step 411). For example, the 1-byte checksum and the 10-byte identifier may be written into the master image 24 to appear in that order in logical block 1 of the storage media 24 at the beginning thereof. Of course, the part identifier and the verifying checksum may be written to appear in other areas of dead space, and other forms of verification may be employed, all without departing from the spirit and scope of the present invention. In one embodiment of the present invention, the copying software also stores the part identifier in a separate file 26 (FIG. 5) for later reference (step 413), as will be discussed in more detail below.

In one embodiment of the present invention, the tracking and verification information/benchmark also includes an encrypted security identifier closely tied to the data in the master image 24/image file, such as for example an encrypted checksum of at least a portion of the data in such master image 24/image file. Thus, alteration of such data will result in a mis-match with regard to the encrypted security identifier. In one embodiment of the present invention, the copying software 22 on the master computer 14 develops the encrypted security identifier based on the entire FAT and also based on the part identifier as such items appear in the master image 24/image file. Notably, basing such identifier on the FAT is particularly useful since practically any alteration to the data on the copied-to storage media 10 will result in a change in the FAT thereof, thus resulting in the aforementioned mis-match. Of course, such encrypted security identifier may be based on other elements as they appear in the master image 24/image file without departing from the spirit and scope of the present invention.

In one embodiment of the present invention, the copying software 22 produces the encrypted security identifier by calculating the checksum of each byte in the FAT and in the part identifier (step 415), and then encrypting such checksum by way of any appropriate encrypting algorithm (step 417). Thus, if the FAT or the part identifier changes, the encrypted checksum will no longer match, as will be discussed in more detail below. The encrypting algorithm employed may be a one-way or two-way encrypting algorithm, and may produce an encrypted value having a pre-determined length, such as 100 bytes. Of course, other methods of producing an encrypted security identifier tied to the data in the image file may be employed without departing from the spirit and scope of the present invention.

The copying software 22 then writes the resulting 100-byte encrypted checksum into the aforementioned dead space in the same manner as the part identifier (step 419). For example, such 100-byte encrypted number security identifier may be written into the master image 24 to appear in logical block 1 with the 10 byte part identifier. For additional security, the copying software 22 may also write a 1-byte byte count of the 100-byte encrypted checksum to appear in the logical block 1 (step 421). In one embodiment of the present invention, such 1-byte byte count is written immediately after the 10-byte part identifier, and is immediately followed by the 100-byte encrypted checksum. Of course, other methods of writing the encrypted checksum and related indicia into the dead space may be employed without departing from the spirit and scope of the present invention.

Although it should be apparent to the relevant public, it is nevertheless noted that writing information into the dead space of the copied-to storage media 10 in actuality means writing such information into the corresponding master image 24/image file in an appropriate location thereof such that such information is appropriately copied into the dead space when the master image 24/image file is copied to the copied-to storage media 10. It should also be apparent but again is nevertheless noted that any software that reads from/writes to such dead space, such as the software discussed below, must include or have access to an appropriate utility application in order that such software can in fact direct the drive receiving the copied-to storage media to read from/write to such dead space as appropriate. Further, it should be noted that since such information is not indexed in the FAT of the master image 24/image file or of the copied-to storage media 10, such information must be written into the dead space in a pre-determined location known to each entity that is to access such information.

The encrypted checksum disclosed above is never stored anywhere other than in the master image 24/image file and on the copied-to storage media 10. Instead, such encrypted checksum is re-derived at appropriate times and is then compared with the stored value in the master image 24/image file or on the copied-to storage media to verify that the FAT and the part identifier on the copied-to storage media 10 have not been changed as compared with the FAT and the part identifier in the master image 24/image file produced by copying software 22 on the master computer 14. As should be appreciated, the FAT on the copied-to storage media 10 will change if, for example, a file is added to or deleted from such media 10, a file is altered in size, location, or date of last access, or the like. To summarize, then, any significant change to the data on the copied-to storage media 10 will result in a change to the FAT thereof and will therefore result in a mis-match with regard to the originally derived encrypted checksum.

As it stands, the master image 24/image file produced by the copying software 22 on the master computer 14 includes the entirety of the data on the master 12, and also includes the part identifier and the encrypted checksum stored in dead space. In one embodiment of the present invention, the copying software in addition calculates a second checksum of the entire master image 24/image file, including the part identifier and the encrypted checksum (step 423), and then stores the second checksum in the above-mentioned separate file 26 for later reference (step 425) to ensure that the master image 24/image file has not become corrupted. In such one embodiment, for example, the separate file 26 is an image data file 26 that includes a data structure corresponding to the image file, where the data structure includes an image name as given to the image file, the second checksum, and the part identifier, among other things. Of course, other information may be stored in the image data file without departing from the spirit and scope of the present invention. Moreover, the image data file 26 may have information regarding additional image files, where each image file has a corresponding data structure with such information stored therein. Alternatively, the aforementioned data structure in the image data file may instead be stored in the master image 24/image file, perhaps in the dead space thereof, perhaps obviating the need for such image data file 26.

Copying the Image File to the Copied-to Storage Media

Now that a master image 24/image file based on the master 12 is present in its finalized form, a production copy of the master 12/master image 24 may be made on a copied-to storage media 10 by way of the production computer 16, and specifically by production software 28 loaded onto the production computer 16. As should be evident, the production computer 16 and production software 28 must have access to the finalized master image 24/image file. In addition, and as will be explained below, such items should also have access to the image data file 26. Such master image 24/image file and such image data file 26 may be located on and accessible from the master computer 14 or the network server 20, or may be located on and accessible to the production computer 16 itself, although such files may be located elsewhere without departing from the spirit and scope of the present invention.

Figure 6:
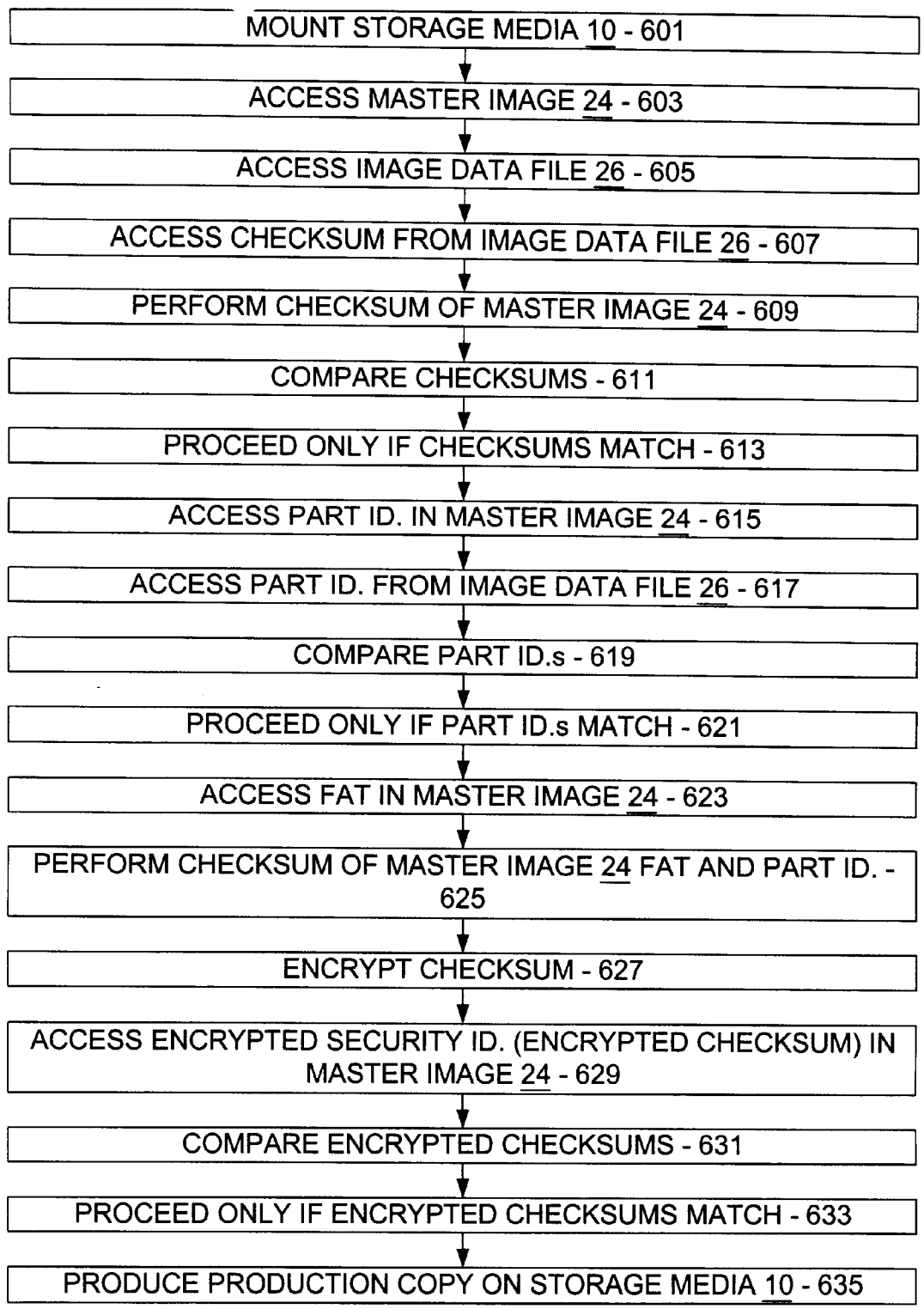
FIG. 6 is a flow chart showing steps performed during production of a production copy of storage media from the image file in accordance with one embodiment of the present invention.

The production computer 16 may be user-directed to make a production copy of the master image 24/image file on a copied-to storage media 10, or may automatically make such a production copy according to a pre-defined routine. In either case, and referring now to FIG. 6, the copied-to storage media 10 is appropriately mounted to an appropriate media drive coupled to the production computer 16 (step 601), the production software 28 on the production computer 16 accesses the master image 24/image file (step 603), and the production software 28 also accesses the image data file 26 with the data structure corresponding to the master image 24/image file, where the data structure includes the image name as given to the master image 24/image file, the second checksum, and the part identifier, among other things (step 605).

In one embodiment of the present invention, after accessing the master image 24/image file and the image data file 26, the production software 28 on the production computer 16 accesses the second checksum from the corresponding data structure in the image data file 26 (step 607), and employs such accessed second checksum to verify that the accessed master image 24/image file is not corrupted. In particular, the production software 28 performs a checksum of the entire accessed master image 24 image file including the part identifier and the encrypted checksum to obtain a performed checksum value (step 609), and compares the performed checksum value with the accessed second checksum to determine whether they match (step 611). If a match is found, the image file is not corrupted, and the production software 28 may proceed (step 613). If a match is not found, the image file is corrupted and the production software 28 does not proceed. Notably, the aforementioned checksum procedure may be performed at any appropriate time without departing from the spirit and scope of the present invention. For example, such procedure is performed each time a master image 24/image file is newly copied to the production computer 16, or each time the master image 24/image file is accessed to make a production copy on a copied-to storage media 10.

Assuming the second checksums compare favorably, the production software 28 next accesses the part identifier as embedded in the dead space in the master image 24/image file (step 615), accesses the part identifier from the corresponding data structure in the image data file 26 (step 617), and compares the master image 24/image file part identifier with the image data file 26 part identifier to determine whether they match (step 619). If a match is found, the image file has not been adulterated, at least with regard to the part-identifier, and the production software 28 may proceed (step 621). If a match is not found, the image file has been adulterated, at least with regard to the part number, and the production software 28 does not proceed. Such adulteration may occur when an unauthorized entity attempts to create a master image 24/image file without benefit of the master computer 14, whereby such unauthorized image file in fact fails to contain a proper part identifier. Of course, such adulteration may also occur under other circumstances.

Assuming the part identifiers compare favorably, the production software 28 next accesses the FAT from the master image 24/image file (step 623), performs a checksum of the FAT and the part identifier (which was previously accessed in step 615) (step 625), and then encrypts such checksum by way of the same encrypting algorithm previously employed by the master computer 14 to produce a production computer encrypted checksum (step 627). The production software 28 then accesses the encrypted checksum as embedded in the dead space in the master image 24/image file (step 629), and compares the image file encrypted checksum with the production computer encrypted checksum to determine whether they match (step 631). If a match is found, the master image 24/image file has not been adulterated, at least in any substantial way such that the FAT or the part identifier would be affected, and the production software 28 may proceed (step 633). If a match is not found, the master image 24/image file has been so adulterated, and the production software 28 does not proceed. Again, such adulteration may occur when an unauthorized entity attempts to create a master image 24/image file without benefit of the master computer 14, whereby such unauthorized master image 24/image file in fact fails to contain a proper encrypted checksum. Of course, such adulteration may also occur under other circumstances.

To summarize, then, prior to producing a producing a production copy on storage media 10 from the master image 24/image file, the production software 28 first verifies the part identifier, which is an unencrypted value, and then verifies the checksum, which is an encrypted value. If either verify fails, such image file is not employed to make the production copy. However, and of course, if both verifies succeed, such image file may then be appropriately employed by the production software 28 on the production computer 16 to produce the production copy on the mounted production (copied-to) storage media (step 635).

As should be appreciated, producing a production copy from a master image 24/image file as is done in step 635 is generally known to the relevant public, and therefore need not be described here in any further detail. It should also be appreciated that any appropriate method for producing such production copy from such master image 24/image file may be employed without departing from the spirit and scope of the present invention. The production copy on the storage media 10 is identical to the master 12 in all respects, except that such production copy has the embedded encrypted checksum and the embedded part identifier in the aforementioned dead space.

Comparing the Image File and the Copied-to Storage Media

Figure 7:
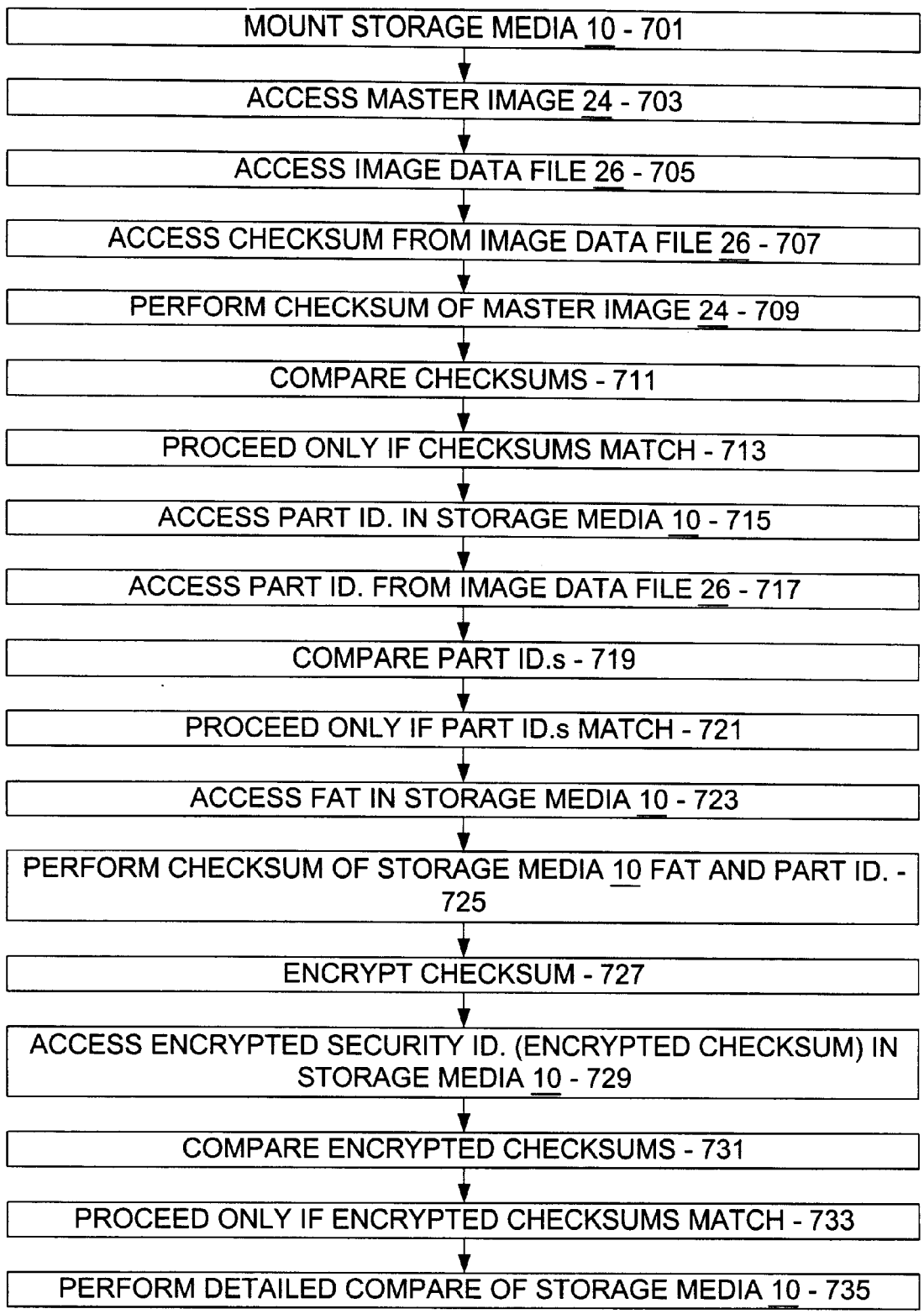
FIG. 7 is a flow chart showing steps performed during a comparison check of the production copy of storage media in accordance with one embodiment of the present invention.

Once the production software 28 on the production computer 16 makes the production copy of the master 12 on the storage media 10 from the master image 24/image file, such storage media 10 must be compared with the master image 24/image file to ensure that the production copy is an accurate rendering of the master image 24/image file. In one embodiment of the present invention, such a compare is performed by comparison software 30 on the comparison computer 18 (FIG. 1). As before with regard to the production computer 16, and turning now to FIG. 7, the production copy of the storage media 10 is appropriately mounted to an appropriate drive of the comparison computer 18 (step 701), and the comparison software 30 on the comparison computer 18 has access to the master image 24/image file and the corresponding data structure in the image data file 26. Essentially, the comparison software 30 repeats the steps performed by the production software with regard to the second checksum, the part identifier, and the encrypted checksum before actually performing a compare, except that such functions are performed with regard to the mounted production copy of the storage media 10, and not the master image 24/image file.

In particular, the comparison software 30 on the comparison computer 16 accesses the master image 24/image file (step 703), the comparison software 30 also accesses the image data file 26 with the data structure corresponding to the master image 24/image file (step 705), and the second checksum from the corresponding data structure in the image data file 26 (step 707), and employs such accessed second checksum to verify that the accessed master image 24/image file is not corrupted. In particular, the comparison software 30 performs a checksum of the entire accessed master image 24/image file including the part identifier and the encrypted checksum to obtain a performed checksum value (step 709), and compares the performed checksum value with the accessed second checksum to determine whether they match (step 711). If a match is found, the image file is not corrupted, and the comparison software 30 may proceed (step 713). If a match is not found, the image file is corrupted and the comparison software 30 does not proceed.

Assuming the second checksums compare favorably, the comparison software 30 next accesses the part identifier as embedded in the dead space in the production copy of the storage media 10 (step 715), accesses the part identifier from the corresponding data structure in the image data file 26 (step 717), and compares the master image 24/image file part identifier with the image data file 26 part identifier to determine whether they match (step 719). If a match is found, the data on the storage media 10 has not been adulterated, at least with regard to the part identifier, and the comparison software 30 may proceed (step 721). If a match is not found, the data on the storage media 10 has been adulterated, at least with regard to the part number, and the comparison software 30 does not proceed.

Assuming the part identifiers compare favorably, the comparison software 30 next accesses the FAT from the production copy of the storage media 10 (step 723), performs a checksum of the FAT and the part identifier (which was previously accessed in step 715) (step 725), and then encrypts such checksum by way of the same encrypting algorithm previously employed by the master computer 14 to produce a production computer encrypted checksum (step 727). The comparison software 30 then accesses the encrypted checksum as embedded in the dead space in the production copy of the storage media 10 (step 729), and compares the production copy encrypted checksum with the comparison computer encrypted checksum to determine whether they match (step 731). If a match is found, the data on the storage media 10 has not been adulterated, at least in any substantial way such that the FAT or the part identifier would be affected, and the comparison software 30 may proceed (step 733). If a match is not found, the data on the storage media has been so adulterated, and the comparison software 30 does not proceed.

To summarize, then prior to comparing the production copy of the storage media 10 with the master image 24/image file, the comparison software 30 first verifies the part identifier of the production copy, which is an unencrypted value, and then verifies the checksum of the production copy, which is an encrypted value. If either verify fails, such production copy is deemed to be corrupted or otherwise improperly made . However, and of course, if both verifies succeed, the comparison software 30 may then compare the production copy of the storage media 10 with the master image 24/image file in detail (step 735).

As should be appreciated, such detailed comparison is generally known to the relevant public, and therefore need not be described here in any further detail. It should also be appreciated that any appropriate method for performing such detailed comparison may be employed without departing from the spirit and scope of the present invention. In general, the detailed comparison by the comparison software 30 on the comparison computer 18 ensures that the production copy of the storage media 10 is a faithful rendition of the master image 24/image file. Assuming the storage media compare succeeds, such storage media is approved for distribution. Otherwise, the storage media is not approved and may be discarded or may be employed for another production copy, assuming the storage media is not physically defective or otherwise unsuitable.

It is to be noted that in performing the various steps detailed above, the copying software 22, production software 28, and comparison software 30 may employ any appropriate methodologies and any appropriate programming, and may be written in any appropriate programming language, all without departing from the spirit and scope of the present invention. Since such methodologies, programming, and languages should be known or apparent to the relevant public, further details thereof are not disclosed herein.

As should now be appreciated, in the present invention, benchmarks are associated with a master image 24/image file and are employed to ensure that such image file is a faithful representative of a master 12, and also to ensure that a production copy of storage media 10 made from the image file is a faithful reproduction of such image file. Thus, an intervening entity cannot manipulate the image file or the production copy without such manipulation being detectable. In addition, if the production copy of the storage media 10 is distributed and returned, the comparison software 30 on the comparison computer 18 or another computer may perform a compare of the returned storage media 10 with the corresponding image file to determine whether the returned storage media 10 has been altered in any manner. Depending on the purpose and result of the determination, then, appropriate action may be taken.

In the foregoing description, it can be seen that the present invention comprises a new and useful benchmark that is placed on an master image 24/image file made from a master 12 and therefore on a production copy of a storage media 10 made from the master image 24/image file. Accordingly, the benchmark is closely tied to such master 12, and reference may be made to the benchmark at various times to determine whether the data in the master image 24/image file and/or on the storage media 10 has changed as compared with the master 12. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method of copying data from a master storage media ("master") for copying such data to a copied-to storage media, the method comprising:

reading the data on the master into a master image file;

manipulating the master image file to include a benchmark comprising tracking and verification information tied to at least a portion of the master image file, whereby a copied-to storage media as copied from the master image file also includes such benchmark, whereby a data alteration of the master image file causes a mis-match with regard to the benchmark in such master image file, and whereby a data alteration of the copied-to storage media also causes a mis-match with regard to the benchmark in such storage media as copied from such master image file.

2. The method of claim 1 wherein the master has a file directory thereon, wherein reading the data comprises:

accessing the file directory on the master;

ascertaining file information from the file directory; and reading the data on the master into a master image file based on such file information.

3. The method of claim 2 wherein the file directory is a DOS file allocation table (FAT).

4. The method of claim 1 comprising reading all of the data on the master into the master image file, such master image file thereby containing a master image of the master and being available to create a copied image of the master on the copied-to storage media.

5. The method of claim 1 wherein manipulating the master image file to include a benchmark comprises inserting a part identifier into the master image file which identifies such master image file.

6. The method of claim 5 comprising inserting the part identifier into an area of the master image file such that the part identifier appears in a normally inaccessible area in a copied-to storage media as copied from the master image file.

7. The method of claim 6 comprising inserting the part identifier into an area of the master image file such that the part identifier appears in dead space in a copied-to storage media as copied from the master image file, the dead space not normally being accessible by an operating system of a computer having the copied-to storage media mounted thereto, but accessible by a utility application running on such computer.

8. The method of claim 5 comprising inserting a 10-byte part identifier.

9. The method of claim 5 further comprising inserting a byte count of the part identifier into the master image file adjacent the part identifier.

10. The method of claim 5 further comprising storing the inserted part identifier in an image data file separate from the master image file.

11. The method of claim 10 further comprising:

calculating a checksum of the entire master image file, including the benchmark; and storing the checksum in the image data file, whereby the stored checksum is available for later reference to ensure that the master image file has not become corrupted.

12. The method of claim 1 wherein manipulating the master image file to include a benchmark comprises inserting a security identifier into the master image file, where the security identifier is tied to the data in such master image file.

13. The method of claim 12 comprising inserting the security identifier into an area of the master image file such that the security identifier appears in a normally inaccessible area in a copied-to storage media as copied from the master image file.

14. The method of claim 13 comprising inserting the security identifier into an area of the master image file such that the part identifier appears in dead space in a copied-to storage media as copied from the master image file, the dead space not normally being accessible by an operating system of a computer having the copied-to storage media mounted thereto, but accessible by a utility application running on such computer.

15. The method of claim 12 comprising inserting a security identifier produced by.

calculating a checksum of each byte of at least a portion of the master image file; and encrypting the calculated checksum by way of an encrypting algorithm.

16. The method of claim 15 comprising calculating a checksum of each byte of at least a portion of the master image file including a file directory thereof.

17. The method of claim 16 wherein the file directory is a DOS file allocation table (FAT).

18. The method of claim 15 comprising encrypting the calculated checksum by way of an encrypting algorithm that produces an encrypted value having a pre-determined length.

19. The method of claim 12 further comprising inserting a byte count of the security identifier into the master image file adjacent the security identifier.

20. The method of claim 1 further comprising:

calculating a checksum of the entire master image file, including the benchmark; and storing the checksum in an image data file separate from the master image file, whereby the stored checksum is available for later reference to ensure that the master image file has not become corrupted.

21. A computer-readable medium having stored thereon a computer-readable data structure comprising a first field containing a benchmark comprising tracking and verification information tied to at least a portion of the data structure, whereby a data alteration of the data structure causes a mis-match with regard to the benchmark in such first field.

22. The computer-readable medium of claim 21 having stored thereon a computer-readable data structure comprising a first field containing a benchmark comprising tracking and verification information tied to at least a portion of the data structure, whereby a copied-to storage media as copied from the data structure also includes such benchmark, whereby a data alteration of the data structure causes a mis-match with regard to the benchmark in such first field, and whereby a data alteration of the data structure also causes a mis-match with regard to the benchmark in such storage media as copied from such data structure.

23. The computer-readable medium of claim 21 wherein the benchmark includes a part identifier.

24. The computer-readable medium of claim 23 wherein the benchmark includes a 10-byte part identifier.

25. The computer-readable medium of claim 23 wherein the benchmark further includes a byte count of the part identifier.

26. The computer-readable medium of claim 21 wherein the first field appears in a normally inaccessible area in a copied-to storage media as copied from the data structure.

27. The computer-readable medium of claim 26 wherein the first field appears in dead space in a copied-to storage media as copied from the data structure, the dead space not normally being accessible by an operating system of a computer having the copied-to storage media mounted thereto, but accessible by a utility application running on such computer.

28. The computer-readable medium of claim 21 wherein the first field appears in a normally inaccessible area in the data structure.

29. The computer-readable medium of claim 28 wherein the first field appears in dead space in the data structure, the dead space not normally being accessible by an operating system of a computer, but accessible by a utility application running on such computer.

30. The computer-readable medium of claim 21 wherein the benchmark includes a security identifier tied to the data in the data structure.

31. The computer-readable medium of claim 30 wherein the security identifier comprises a checksum of each byte of at least a portion of the data structure.

32. The computer-readable medium of claim 31 wherein the security identifier comprises a checksum of each byte of at least a portion of the data structure, the checksum being encrypted by way of an encrypting algorithm.

33. The computer-readable medium of claim 32 wherein the checksum is encrypted by way of an encrypting algorithm that produces an encrypted value having a predetermined length.

34. The computer-readable medium of claim 30 further comprising a second field containing a file directory, wherein the security identifier comprises a checksum of each byte of at least a portion of the data structure including the file directory.

35. The computer-readable medium of claim 34 wherein the file directory is a DOS file allocation table (FAT).

36. The computer-readable medium of claim 30 wherein the benchmark further includes a byte count of the security identifier.

* * * * *